(12) United States Patent  (10) Patent No.: US 8,170,859 B1
Christensson et al.  (45) Date of Patent: May 1, 2012

(54) METHODS, APPARATUSES AND COMPUTER PROGRAM PRODUCTS FOR SIMULATING ARBITRARY UNMODIFIED CODE

(75) Inventors: Magnus Christensson, Stockholm (SE); Samuel Rydh, Stockholm (SE); Magnus Vesterlund, Stockholm (SE); Johan Rydberg, Färjestaden (SE)

(73) Assignee: Intel Corporation, Santa Clara, CA (US)

( * ) Notice: Subject to any disclaimer, the term of this patent is extended or adjusted under 35 U.S.C. 154(b) by 855 days.

(21) Appl. No.: 11/412,831

(22) Filed: Apr. 28, 2006

(51) Int. Cl.
*G06F 9/45* (2006.01)
*G06F 9/455* (2006.01)

(52) U.S. Cl. ............. 703/22; 703/23; 717/138; 717/139
(58) Field of Classification Search .................... 703/13, 703/20, 21, 22, 26, 27, 23, 17; 718/1; 717/134, 717/135, 138–139
See application file for complete search history.

(56) References Cited

U.S. PATENT DOCUMENTS

| | | | |
|---|---|---|---|
| 6,397,242 B1 * | 5/2002 | Devine et al. ...................... 718/1 |
| 7,107,580 B2 * | 9/2006 | Zemach et al. ............... 717/136 |
| 7,177,967 B2 * | 2/2007 | Jeyasingh et al. ............. 710/260 |
| 2005/0240819 A1 * | 10/2005 | Bennett et al. ................... 714/34 |
| 2007/0157198 A1 * | 7/2007 | Bennett et al. ..................... 718/1 |

OTHER PUBLICATIONS

Lars Albertsson and Peter S Magnusson, "Using Complete System Simulation for Temporal Debugging of General Purpose Operating Systms and Workloads", IEEE, 2000, pp. 191-198.*
Peter S Magnusson et al., "SimICS/sun4m: A Virtual Workstation", Proceedings USENIX '98', Swedish Institute of Computer Science, Apr. 2002.*
Robert Rose, "Survey of System Virtualization Techniques", Mar. 2004, downloaded from http://ir.library.oregonstate.edu/jspui/handle/1957/9907.*
Smith, James E., et al., "Virtual Machines, Versatile Platforms for Systems and Processes," Elsevier, Inc., 2005.

* cited by examiner

*Primary Examiner* — Paul Rodriguez
*Assistant Examiner* — Cedric D Johnson
(74) *Attorney, Agent, or Firm* — Trop, Pruner & Hu, P.C.

(57) ABSTRACT

Arbitrary, unmodified code and/or software may be executed directly on a host processor operating in a virtualized mode using hardware virtualization support and performance counters. The arbitrary software may be run on the host processor until the host processor exits from the virtualized mode. An end execution time may be calculated in response to the host processor exiting from the virtualized mode. An event may then be handled based on an execution time at which the host processor exited from the virtualized mode and a time at which a scheduled event was to occur.

29 Claims, 2 Drawing Sheets

METHODS, APPARATUSES AND COMPUTER PROGRAM PRODUCTS FOR SIMULATING ARBITRARY UNMODIFIED CODE

BACKGROUND

1. Field of the Invention

Example embodiments of the present invention relate to faster deterministic simulation of arbitrary, unmodified software or code.

2. Description of the Conventional Art

Cost and time expenditure are increasing problems in software development. Often software development projects end up over budget, behind schedule and/or with systems that operate poorly. Using conventional software simulators, software or computer program code may be developed before real hardware systems become available. So long as hardware specifications are available, a virtual hardware model may be created, allowing software development to begin earlier than otherwise would be possible. This may reduce the time-to-market of the software.

Conventional software simulators may be used in simulating software such as operating systems, programming languages, compilers, computer architecture, etc. Conventional simulators may allow greater visibility into systems on which the software is running. For example, when simulating software using a conventional simulator, execution may be stopped and the state of the entire system (e.g., including hardware devices) may be non-intrusively inspected at any time. When simulating operating systems, for example, simulators may allow for more effective resource sharing, while maintaining a higher degree of security. Additionally, conventional simulators may allow hardware failures to be simulated more easily, which may enable hardware failure testing that would be more difficult and/or impossible on real hardware.

One example, conventional technique for simulating software may use an interpreter. An interpreter tracks the state of the simulated processor, memories and/or devices, decodes instructions of the software, and runs routines performing actions of the simulated instructions on the state of the simulated machine. An interpreter, however, may run software slower than a real hardware system with performance similar to that of the host.

Another conventional simulator may use just-in-time compilation. Just-in-time compilation recompiles software into code that may be run directly on a host processor. However, this may also result in slower execution of the software.

To properly simulate software, conventional simulators need to track simulated time. Simulated time may or may not be related to real time, but may be based on a metric of the execution of a simulated system, for example, the number of executed instructions. Simulated time may not be uniform throughout the simulated system, for example, each simulated processor may keep its own time in a multi-processor simulated system.

Simulators need to track simulated time because simulated software may expect certain actions to take time. For example, when an action requiring time is performed, an event specifying that something should happen at a specified point in the future may be posted. For example, when a disk transaction finishes, an interrupt should be raised to the simulated processor. The point in the execution of simulated software at which an event is handled may affect the execution. In order to be deterministic, a simulator must always handle the same event at the same point in the execution. To do so, simulated time must be completely virtualized and may not have any connection to real-time.

Conventional deterministic simulators based on interpreters or just-in-time compilation may count the number of executed instructions and use the result as the time metric. The time at which an event is to be handled may be converted to a number of executed instructions. When that number of instructions has been executed, the interpreter or just-in-time compiled code may stop and handle the event.

Another example manner in which a unique point in the execution of the simulated software may be identified may use a combination of the number of executed branch instructions and a current program counter. When the simulated processor is compatible with the host processor, the software may be simulated by running the software directly on the host processor. This may yield simulation speeds closer to those associated with running the simulated software on real hardware. However, achieving deterministic simulation in this way may be more difficult because identifying the current point in the execution and stopping the execution at the point where an event should be handled may be more difficult and/or impossible.

Simulated software may be deterministically simulated by being run directly on the host processor using the host's hardware performance counters to track the current point in the execution, and using interrupts associated with the performance counters to stop the execution before an event should be handled. Using these techniques target software may be simulated deterministically at speeds closer to speeds achieved when running the software on real hardware. However, these conventional techniques may not completely execute any arbitrary, unmodified program code or software deterministically because the simulated arbitrary, unmodified software and/or program code may overtake the host processor, interfere with host software and/or crash the host when given sufficient privileges. To reduce the likelihood of these occurrences, the simulated software may be run with more limited privileges. However, host processor architectures may not run some parts of the simulated software, (e.g., the kernel of an operating system) with limited privileges. As a result, these portions of the simulated software must be run in an interpreter or be just-in-time compiled. Because these portions of software may constitute a large part of some workloads, this may result in performance degradation.

Alternatively, to reduce the likelihood of the above described occurrences, trusted, non-interfering software (e.g., only software that does not interfere with the host software) may be run on the host processor. However, most workloads must be modified to simulate in this way, and this modification may be difficult and/or impossible. Regardless, all portions of any arbitrary, unmodified software and/or program code may not be run directly on the host processor.

In addition, the architecture of the host processor may be limited, which may limit the virtualization of the processor. That is, for example, it may be impossible to fully virtualize the processor because the simulated software may identify the model of the host processor on which it is running instead of the model of the simulated processor. As a result, the simulated software may read processor registers containing host states, leaking information from the host processor to the simulated processor. This may result in less than complete virtualization of the target and non-determinism if the host state accessed by the simulated processor changes between executions.

SUMMARY OF THE INVENTION

Example embodiments of the present invention relate to methods, apparatuses, computer programs and computer program products for faster deterministic simulation of arbitrary and/or unmodified software or program code. The methods, apparatuses, computer programs and/or computer program products for simulation may be deterministic and/or repeatable.

At least one example embodiment of the present invention provides a method for deterministically simulating arbitrary and/or unmodified software or code directly on a host processor operating in a virtualized mode. The software may be run until the host processor exits from the virtualized mode. A current execution time at which the host processor exited from the virtualized mode may be calculated, and an event may be handled based on at least the current execution time and a scheduled event handling time. The scheduled event handling time may be a time at which a scheduled event is to be handled, and the event may be one of the scheduled event or an unscheduled event.

At least one other example embodiment of the present invention provides another method for deterministically simulating arbitrary and/or unmodified software directly on a host processor operating in a virtualized mode. The software may be run until the host processor exits from the virtualized mode, and a current execution time may be calculated in response to the host processor exiting from the virtualized mode. The current execution time may be indicative of the time at which the host processor exited from the virtualized mode. Whether an unscheduled event must be handled before a scheduled event may be determined, and at least one unscheduled event may be handled if an unscheduled event must be handled before the scheduled event. The scheduled event may be handled after determining whether the unscheduled event is necessary.

At least one example embodiment of the present invention provides an apparatus for deterministically simulating arbitrary and/or unmodified software. The apparatus may include at least one performance counter and at least one host processor. The at least one performance counter may track execution of the software, and the at least one host processor may operate in a virtualized mode. The at least one host processor may be configured to run the arbitrary software in a virtualized mode until the processor exits from the virtualized mode, calculate a current execution time based on the value of the performance counter in response to exiting from the virtualized mode, and handle an event based on at least the current execution time and a scheduled event handling time. The scheduled event handling time may be a time at which a scheduled event is to be handled, and the event may be one of the scheduled event or an unscheduled event.

At least one other example embodiment of the present invention provides an apparatus for deterministically simulating arbitrary and/or unmodified software. At least this apparatus may include at least one performance counter and at least one host processor. The at least one performance counter may track execution of the software, and the at least one host processor may operate in a virtualized mode. The at least one host processor may be configured to run the software until the host processor exits from the virtualized mode, calculate a current execution time in response to exiting from the virtualized mode, determine whether an unscheduled event must be handled before a scheduled event, execute at least one unscheduled event if an unscheduled event must be handled before the scheduled event, and handle the scheduled event. The current execution time may be indicative of the time at which the host processor exited from the virtualized mode At least one example embodiment of the present invention provides a computer program embodied on a computer readable medium for execution on a computer. At least this computer program may be configured to carry out a method for deterministically simulating arbitrary and/or unmodified software directly on a host processor operating in a virtualized mode. The method may include running the software until the host processor exits from the virtualized mode, calculating a current execution time at which the host processor exited from the virtualized mode, and handling an event based on at least the current execution time and a scheduled event handling time. The scheduled event handling time may be a time at which a scheduled event is to be handled, and the event may be one of the scheduled event or an unscheduled event.

At least one other example embodiment of the present invention provides a computer program embodied on a computer readable medium for execution on a computer. At least this computer program may be configured to perform a method for deterministically simulating arbitrary and/or unmodified software directly on a host processor operating in a virtualized mode. The method may include running the software until the host processor exits from the virtualized mode, calculating a current execution time in response to the host processor exiting from the virtualized mode, determining whether an unscheduled event must be handled before a scheduled event, executing at least one unscheduled event if an unscheduled event must be handled before the scheduled event, and handling the scheduled event. The current execution time may be indicative of the time at which the host processor exited from the virtualized mode In at least some example embodiments of the present invention, a start execution time may be set, and a performance counter metric may be generated based on the start execution time and the scheduled event handling time. Whether the performance counter metric is acceptable may be determined, and the software may be run if the performance counter metric is determined to be acceptable.

In at least some example embodiments of the present invention, the difference between the start execution time and the scheduled event handling time may be calculated, and the calculated difference may be converted into the performance counter metric. The performance counter metric is acceptable if the performance counter metric passes a threshold metric, and the performance counter metric passes the threshold metric if the performance counter metric is greater than the threshold metric.

In at least some example embodiments of the present invention, if the performance counter metric is unacceptable, the software may be interpreted from the current execution time until the scheduled event handling time, and the scheduled event may be handled at the scheduled event handling time. The unscheduled event may comprise interpreting the software until the scheduled event handling time is reached.

In at least some example embodiment of the present invention, the current execution time may be compared with the scheduled event handling time, the unscheduled event may be handled if the current execution time is less than the scheduled event handling time, and the scheduled event may be handled after handling the unscheduled event. The unscheduled event may include at least interpreting the software until the scheduled event handling time has been reached.

In at least some example embodiments of the present invention, whether simulation of the software has completed may be determined or decided, and the running, calculating and handling may be repeated if the simulation of the software is not complete.

In at least some example embodiments of the present invention, the current execution time may be compared with the scheduled event handling time, and the scheduled event may be executed if the current execution time is equal to the scheduled event handling time. The simulating may be performed on the host processor using hardware virtualization support.

In at least some example embodiments of the present invention, whether an interrupt has been received and/or whether emulation of an action is needed by the host processor may be checked, and the current execution time may be compared with a scheduled event handling time associated with the scheduled event. If an interrupt has been received by the host processor, emulation of an action is needed or the current execution time is less than the scheduled event time, an unscheduled event must be handled before the scheduled event. The checking whether an interrupt has been received by the host processor and checking whether emulation of an action is needed may be performed simultaneously or consecutively. The unscheduled event may not be required to be handled before the scheduled event if an interrupt has not been received by the host processor, no emulation of an action is needed and the current execution time is equal to the scheduled event time.

In at least some example embodiments of the present invention, the at least one unscheduled event may be handling an interrupt received by the host processor, emulation of an action or interpreting the software.

In at least some example embodiments of the present invention, the running, calculating, determining, executing and handling may be repeated for a next scheduled event handling time, if the simulation of the software is not complete.

In at least some example embodiments of the present invention, the at least one host processor may include a plurality of host processors and/or the at least one performance counter may include a plurality of performance counters. Each of the plurality of host processors may have at least one of the plurality of performance counters corresponding thereto.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS OF THE PRESENT INVENTION

Figure 1:
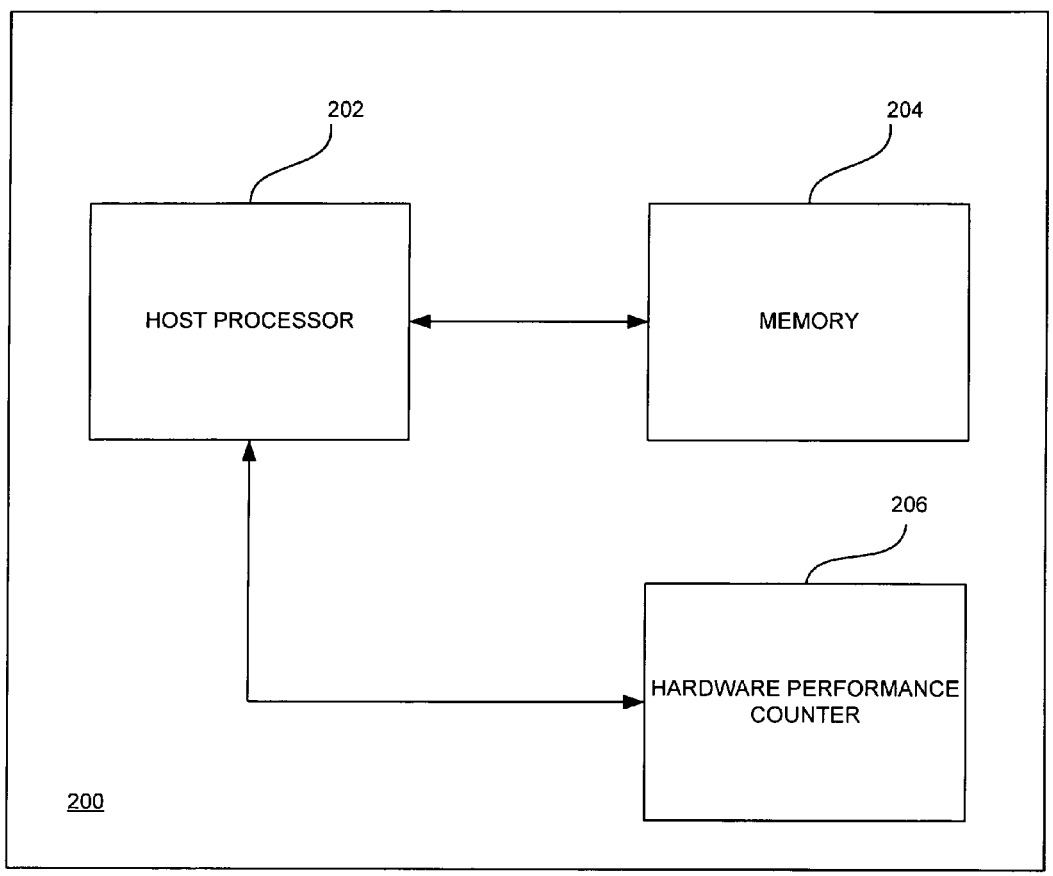
FIG. 1 is a block diagram illustrating a simulator device according to an example embodiment of the present invention.

Example embodiments of the present invention relate to methods, apparatuses, computer programs and computer program products for faster deterministic simulation of arbitrary and/or unmodified software or program code. Example embodiments of the present invention may run target program code and/or target software directly on a host processor using hardware virtualization support and hardware performance counters. The hardware performance counters may be used to control the timing of simulation events. Hardware virtualization support may be used to achieve complete virtualization of the target processor and/or simulation speeds closer to those achieved when running the target software on real hardware. Together with virtualized device models, a completely virtualized target system may be realized.

Simulators, according to at least some example embodiments of the present invention, may be deterministic full system simulators. Determinism refers to the result of an execution. For example, a simulation may be deterministic if target software is executed in the same manner beginning at a certain machine state, and given a certain input or input sequence. Because a deterministic simulator controls the state of all components in the target system, the entire state of the simulation may be stored to memory and/or disk at any time. The stored entire state of the simulation is referred to as a checkpoint. When simulating software beginning, for example, at a checkpoint, all input to the target system may be recorded. This may enable a specific execution of the software to be repeated.

For example, in debugging target software or code, it may be desirable for a user to be able to re-execute the target software or code after a bug has been triggered. In this example, a checkpoint may be saved or stored before starting the simulation, and all input or input sequences may be recorded as the target software executes. After a bug has been triggered, the simulation may be restarted from the stored checkpoint (e.g., the same initial state), and the recorded input may be replayed. Because the same initial state and the same input or input sequence result in the same execution, the bug will be triggered again, and the cause of the bug may be identified.

Some example bugs are those whose effects appear indirectly, for example, a time after the target code containing the bug has been executed. While the effects of the bug may be observed, the cause of the bugs may not be apparent at that time the bug is identified. Random access memory (RAM) corruption is one example of such a bug.

To identify the cause of this example bug, target software may be executed backwards in time to the point where the problem was introduced. Using checkpointing, deterministic simulation and input recording the target software may be executed in reverse.

A system running on a simulator supporting repeatable execution and/or reverse execution may also be used as a honey pot, attracting attacks on a network. For example, if the target system is compromised, the recorded execution may be replayed from a stored checkpoint to determine the method used by the attacker to break into the target system.

FIG. 1 is a block diagram of a simulator apparatus or device (e.g., a deterministic full system simulator device) according to an example embodiment of the present invention. As shown, a simulator device 200 may include a host processor 202, a memory 204 and a hardware performance counter 206. Although shown as separate components in FIG. 2, it will be understood that the host processor 202 and the performance counter 206 may be embodied or located on the same processor, such as, a digital signal processor (DSP), application specific integrated circuit (ASIC), etc. Alternatively, the hardware performance counter 206 may be embodied as software running on the host processor 202.

For example purposes, example embodiments of the present invention will be described with regard to the example block diagram shown in FIG. 1; however, it will be understood that simulator devices, according to example embodiments of the present invention, may be embodied on, or as, any suitable computer system having any configuration suitable for achieving the same or substantially the same functionality. Moreover, although the simulator 200 shows only a single host processor 202, a single memory 204 and a single performance counter 206, the simulator device is not limited thereto. The simulator device 200 may include any number of host processors, memories and/or performance counters, each of which may be the same as or different from one another.

The simulator device 200 may simulate one or more computer systems, referred to as "targets," on the host processor 202. The host processor 202 may be a DSP, ASIC, or any other computer processor having the appropriate functionality and/or ability to run simulation software to carry out simulation methods according to example embodiments of the present invention. Methods for simulating, according to example embodiments of the present invention, will be discussed in more detail below with regard to FIG. 2. As discussed herein, "simulator," may refer to simulation software running on the host processor 202.

In example embodiments of the present invention, target systems and/or processors may be completely virtualized, for example, the simulator may completely control the state of the targets and the behavior of the targets may be completely independent of the host processor 202 on which the targets are simulated.

Example embodiments of the present invention may use hardware virtualization support to run different operating systems on the host processor 202 concurrently, and/or to run multiple copies of the same operating system concurrently. Hardware virtualization may also enable virtualized code to run at higher speeds and/or protect concurrently simulated operating systems from each other so that one operating system may not interfere with another even if one of the operating system crashes. Hardware virtualization support may provide virtualization of the targets so that the operating systems may run as if they were the sole operating system running on the host processor 202.

To support complete hardware virtualization, simulators according to example embodiments of the present invention, may include a monitor. The monitor may be embodied as a software program also run on the host processor 202. The monitor may be part of the simulator software, or alternatively, the monitor may be separate from the simulator software. The monitor may run at the highest privilege level, may supervise execution and/or manage the distribution of hardware resources (e.g., processor time and access to hardware devices) between virtualized operating systems. According to example embodiments of the present invention, at least some privileged operations of the targets may be limited to reduce the likelihood and/or prevent virtualized operating system from obtaining complete control of the computer. For example, memory management operations may be limited so that different virtualized operating systems may not access each other's memories. In addition, or alternatively, access to hardware devices may be limited to reduce the likelihood and/or prevent different virtualized operating systems from accessing the same device in conflicting ways and/or crashing the host processor 202. Access to some processor states may also be limited to reduce the likelihood and/or prevent information from leaking from the monitor to virtualized operating system and/or between different virtualized operating systems.

When the monitor runs a virtualized operating system on the host processor 202, the monitor may establish a memory management state of the host processor 202 (e.g., page tables, segmentation, etc.) for the virtualized operating system in the memory 204. The state of the virtual processor may be loaded from the memory 204 onto the host processor 202 and control may be given to the virtualized operating system. The operating system may run at native speed on the host processor 202. Control may be returned to the monitor when the virtualized operating system encounters a limitation set by the hardware virtualization support and/or when an action unrelated to the virtualized operating system needs to be handled by the monitor (e.g., an interrupt from a host device, etc.). The monitor may ensure that an operating system does not execute too long by establishing a hardware timer to trigger an interrupt causing the host processor 202 to exit from virtualized mode.

In at least one example embodiment of the present invention, the hardware performance counter 206 (e.g., counters of executed instructions, counters of executed branches and/or associated interrupts) may be used to control the timing of simulation events so that events may be handled at the same or substantially the same point in identical simulations. This may ensure deterministic simulation of software.

Hardware virtualization support on the host processor 202 may provide control of the target software such that the software may not modify anything outside of the simulated state, interfere with the simulator, interfere with other software on the host processor 202 and/or crash the host processor 202. Hardware virtualization support may restrict the target software from retrieving information about the host processor 202 and/or host machine, such as, a software state and/or a hardware state, and/or guarantee return of control to the host software so that simulated software may not hang and/or crash the host machine.

Hardware performance counters 206, either alone or in combination with some other part of the system state, may identify a particular point in the execution, for example, by counting the number of executed instructions and/or number of executed branches in combination with the current program counter. In example embodiments of the present invention, the simulator may know the value of the hardware performance counter 206 before the host processor 202 enters virtualized mode by setting the hardware performance counter 206 to a known value or reading the current value of the hardware performance counter 206. Alternatively, hardware performance counter values may be loaded from the memory 204 when virtualized processor mode is entered, and stored again when virtualized mode is exited. An exact count of executed instructions or branches may be calculated by subtracting the value of the hardware performance counter 206 before execution and after execution in virtualized mode.

In another example, the simulator may set or read the hardware performance counter value before entering virtualized mode, and read the performance counter value again after exiting the virtualized mode. Each of the read performance counter values may be stored in the memory 204. In this example, the simulator must know the number of executed host instructions and/or branches between the point where the hardware performance counter 206 is read (or written) and the point at which the virtualized mode is entered, and between the point where virtualized mode is exited and the point at which the performance counter 206 is read. This entire sequence may be executed in a state where the simulator has full control of the host processor 202, such that the host operating system may not intervene, schedule other processes and/or execute any extra host instructions that the simulator may not compensate for, without the knowledge of the simulator. For example, the simulator may execute this sequence with interrupts disabled.

Using performance counter interrupts (e.g., interrupts associated with the hardware performance counter 206), the target software may be run until a specified point in simulated time, and execution may be stopped to handle events at the correct point in the execution.

In example embodiments of the present invention, the performance counter 206 may allow an interrupt to be triggered when the performance counter 206 reaches a certain value, referred to herein as a threshold metric. When the interrupt is triggered, the host processor 202 may exit from the virtualized mode. The value at which the performance counter 206 triggers the interrupt may be programmable or a fixed value. In at least some example embodiments of the present invention, the threshold metric may be a set value of the performance counter 206, or a programmed value at which an interrupt will be triggered because an event (e.g., a scheduled event) is scheduled to be handled. The threshold metric may be determined based on a point in the execution at which the event is scheduled to be handled. This time may be referred to as a scheduled event handling time. In at least some example embodiments of the present invention, the threshold metric may be set such that the host processor exits from the virtualized mode before the scheduled event handling time (e.g., point in the execution where the next event should be handled) is reached.

As discussed above, a number of host instructions may be executed between set up of the performance counter 206 and entering of the virtualized mode. In this example, instructions counted by the performance counter 206, but not part of the target software must be compensated for when setting the performance counter interrupt.

Performance counter interrupts may be imprecise, for example, the interrupt may not be taken immediately upon reaching the threshold metric. However, the interrupt may be taken within a threshold number of instructions. Simulators, according to example embodiments of the present invention, must compensate for this latency by setting up the performance counter 206 so that the interrupt will be taken no later than the scheduled event handling time. For example, if an interrupt should be handled after executing 500 instructions (e.g., the scheduled event handling time is 500 instructions), and the threshold number of instructions is 100, the threshold metric may be set to 400 instructions, and the interrupt may be programmed to trigger the interrupt after executing 400 instructions. This may ensure that the interrupt is taken before the 500 instructions are executed, even if the interrupt is not taken until the threshold number of instructions (e.g., 100 instructions in this example) has been reached. In the example above, if the virtualized mode is exited after executing 450 instructions, the remaining 50 instructions may be interpreted.

In another example, if a combination of the number of executed branches and the program counter is used, a performance counter for executed branches may be treated similarly. In this example, the simulation may continue to simulate in the virtualized mode closer to the scheduled event handling time. That is, for example, the threshold metric may be set to a smaller value. The simulator may ensure that the execution will not overrun (e.g., run too far) by setting a hardware breakpoint at the address where a hardware program counter will be at that time. The simulator may not be certain that the correct number of branches has been executed when the breakpoint has been hit, so the simulator may run to the breakpoint repeatedly and check a branch counter until it reaches the desired value.

Figure 2:
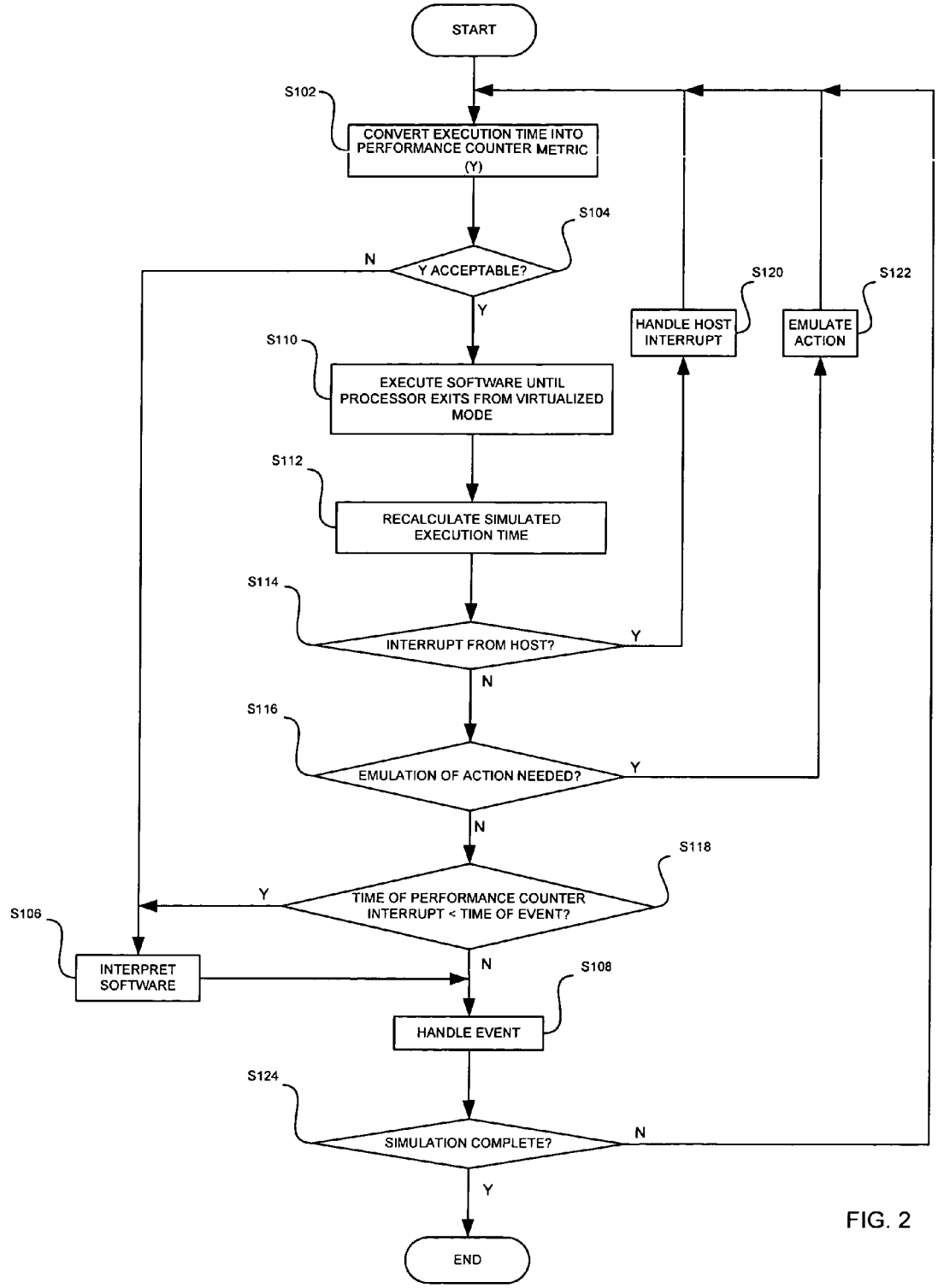
FIG. 2 illustrates a method for simulating arbitrary and/or unmodified software or code, according to an example embodiment of the present invention.

FIG. 2 illustrates a method for simulating arbitrary, unmodified code and/or software, according an example embodiment of the present invention. The method of FIG. 2 may be executed by a simulator being run on the host processor 202 of FIG. 1. The method shown in FIG. 2 refers to a simulator that may execute software until a first scheduled event posted at a scheduled event handling time (e.g., X simulated seconds into the future). However, it will be understood that this method may be performed iteratively for multiple scheduled events.

Referring to FIG. 2, at S102, the execution time X may be converted into a corresponding performance counter metric Y. The execution time X may be the difference between a current execution time and a scheduled event handling time. In this case, the current execution time may be the starting point in the execution, or the start execution time. As mentioned above, the scheduled event handling time may represent the point in the execution where the scheduled event is scheduled to be handled. The performance counter metric Y may be measured in executed instructions and/or branches.

At S104, the simulator may determine if the performance counter metric Y is acceptable. The acceptability of the performance counter metric Y may be determined by comparing the performance counter metric Y with a safety threshold metric S. The safety threshold metric S may represent the minimum number of instructions and/or branches of instructions that can be safely executed in the virtualized mode due to imprecise interrupts. If the performance counter metric Y falls below (e.g., is less than) the safety threshold metric S, the simulator may interpret the target software at S106. An unacceptable performance counter metric Y (e.g., Y<S) may indicate that not enough instructions exist between the current execution time and the scheduled event handling time.

In this case, the target software may be interpreted until the scheduled event handling time is reached. Upon reaching the scheduled event handling time, the scheduled event may be handled at S108. At S124, the simulator may determine whether the simulation is complete. The simulation may be determined to be complete based on instructions from, for example, another process on the host, such as, a debugger, a human operator or a script running in the simulator. If the simulation is determined to be complete at S124, the process may terminate. Returning to S124, if the simulation is not complete, the process may return to S102, and repeat for the next scheduled event.

Returning to S104, if the performance counter metric Y passes the virtualized mode safety threshold metric S, the processor may enter a virtualized mode, and begin executing the target software at S110. For example, the simulator may set a plurality of execution parameters, such as, the initial state of the simulated system in the hardware virtualization support, performance counter values, associated interrupts, etc. After the execution parameters are set, the simulator may enter a virtualized mode, and the target software may execute directly on the host processor until the host processor exits from the virtualized mode. After the host processor exits the virtualized mode, the simulator may read values from the performance counters and calculate a current or end execution time at S112. The current or end execution time may refer to the point in the execution at which the host processor exited form the virtualized mode.

At S114, the simulator may determine if the host processor exited from the virtualized mode because the host processor has received an interrupt from host hardware (e.g., memories, drives, etc.). If the host processor has exited from the virtualized mode because an interrupt has been received from the host hardware, the simulator may return control to the host processor's operating system and allow the operating system to handle the host interrupt at S120. After handling the host interrupt, the process may return to S102 and repeat.

Returning to S114, if an interrupt from the host hardware has not been received by the host processor, the simulator may determine if the processor exited from virtualized mode because target software performed an action needing emulation (e.g., an I/O operation to a virtual device, etc.) at S116. If the simulator determines that the host processor has exited from the virtualized mode because emulation of an action is needed at S116, the action may be emulated at S122. For example, emulation of an action may be needed because the target software performs an action that would be unsafe to run directly on the host processor and/or because the target software is attempting to access a virtual device. After emulating the action at S122, the process may return to S102 and repeat.

Returning to S116, if emulation of an action is not needed, a performance counter interrupt has been received by the host processor, and the host processor may compare the end execution time (e.g., the time at which the performance counter interrupt was received and the host processor exited from virtualized mode) with the scheduled event handling time at S118. That is, for example, at S118 the simulator may determine if the performance counter interrupt was received at a point in the execution prior to the point in which the scheduled event is to be handled. If the end execution time is prior to or less than the scheduled event handling time, the simulator may interpret the target software until the scheduled event handling time (e.g., until the point in the execution where the event should be handled) at S106 and proceed as described above.

Returning to S118, if the end execution time is not less than scheduled event handling time (e.g., the host processor has not exited because a premature interrupt has been received), the scheduled event may be handled at S108. After handling the scheduled event, the simulator may determine if simulation of the target software is complete at S124 as described above. The process may then proceed from S124 as described above. Although not described as a decision, the simulator may also compare the scheduled event time with the values of the performance counters to determine whether the scheduled event should be handled. That is, for example, if the host processor exits from a virtualized mode because an interrupt has been received at the host processor, and the end execution time at which the host processor has exited from the virtualized mode is equal to the scheduled event handling time, the scheduled event may be handled.

In another example embodiment of the present invention, target systems with multiple processors may also be deterministically simulated. In this example embodiment, if there is no communication mechanism between processors with lower latency than L in simulated time, the target systems may be simulated concurrently on different host processors so long as the simulated times of the target processors do not differ more than L. The latency L may be determined, for example, by the structure of the simulated system. This may be achieved, for example, using synchronization protocols. An example synchronization protocol will be discussed in more detail below.

In one example, assuming the communication latency between simulated processors is L and the simulated processors begin at the same simulated time $T_{start}$, an event scheduled to be handled a duration L into the simulated time may be posted on all processors at simulated time $T_{post}=T_{start}+L$. The simulated software may then be run concurrently on all simulated processors, and the execution of each simulated processor may be stopped after handling the posted event. In this example, the simulated time of each processor may be between simulated time $T_{start}$ and $T_{post}$ (e.g., the difference in the simulated time of each processor may be less than L). At simulated time $T_{post}$, all simulated processors may have handled the posted event. This simulated time $T_{post}$ may be used as a new $T_{start}$, and the process may be repeated.

In the above example, unless all simulated processors are executing at the same speed, a portion of the processors may have to wait for other processors that have fallen behind to catch-up. This may waste execution time. To help reduce wasted execution time, a two-phase protocol may be used. In a two-phase protocol, an event scheduled to be handled a duration L/2 into the simulated time may be posted on all processors at simulated time $T_{post}=T_{start}+L/2$. The simulated software may then be run concurrently on all simulated processors. When each simulated processor handles the posted event, each simulated processor may determine if all other simulated processors have reached the simulated time $T_{start}$. If all other simulated processors have not reached the simulated time $T_{start}$, the simulated processor may stop until this occurs. The simulated processor may then use the simulated time $T_{post}$ as a new $T_{start}$, and the process may be repeated.

If two or more target processors may not be simulated concurrently, for example, because there is some communication mechanism between them with lower or no latency (e.g., shared memory) or because the host does not have enough host processors, the target systems may still be deterministically simulated by simulating one target processor at a time and alternating between the target processors. So long as the switches between the processors are done at the same or substantially the same point in the execution and the processors are scheduled in the same order the simulation may be deterministic.

Some workloads may require larger numbers of events with shorter intervals in between. In this example, exiting the host processor's virtualization mode at every event may result in decreased performance. In example embodiments of the present invention, setting performance counters, entering and exiting the virtualized mode for each event requires time, and interpreting instructions from the point at which a performance counter interrupt is received to a point where the event should be handled may increase simulation time. According to at least some example embodiments of the present invention, handling an event at exactly the time it is scheduled may not be necessary. The simulated software may still execute correctly even if events are delayed because simulated software may not rely on the exact timing of, for example, disk operation, network interfaces, etc. In this example embodiment, the number of exits from the virtualized mode may be reduced by grouping events so that several events may be handled at once after the processor exits from virtualized mode. For example, a simulator, according to example embodiments of the present invention, may round the time at which events may be handled to the nearest higher multiple of 1,000,000 instructions, and thus, the simulator need not exit the virtualized mode more often than every 1,000,000 instructions, regardless of the number of events.

In another example embodiment of the present invention, a non-deterministic simulator may be created using hardware virtualization support and performance counters that record times at which all events are handled. The recorded information may be used to repeat the execution in a fully deterministic simulator.

In some example embodiments of the present invention, the simulation need not be fully deterministic so long as the execution may be repeated. For example, when attempting to reproduce a bug in debugging a computer program, operating system, etc. In this example, determinism may not be the primary concern, so long as the execution may be repeated once the bug occurs.

To improve performance in this example embodiment, the host processor may not exit the virtualized mode to handle events. For example, this example embodiment of the present invention may not use performance counter interrupts. Instead, events may be handled only when the virtualized mode is exited for some other reason. Because the host processor may exit the virtualized mode for non-deterministic reasons, for example, because of interrupts from host devices, the simulation will not be deterministic, and two simulations starting from the same state may yield different executions.

However, as discussed above, the execution may still be made repeatable by recording the point in the execution at which each event is handled. To repeat the execution, a fully deterministic simulator may use the event timing recorded in the initial run to handle the events in the exact same points in the execution. This may result in the same execution.

If events sensitive to delayed handling need to be handled, they may be delayed at most by a fixed time by setting a performance counter interrupt. The performance counter interrupt may be set to trigger a fixed period of time after the scheduled event handling time. If the host processor exits from virtualized mode for some other reason after the point at which the event was scheduled to be handled, but before the performance counter interrupt has been received, the simulator may handle the event and cancel the performance counter interrupt. The event may then be handled when the processor exits virtualized mode for some other reason and not cause an unnecessary exit from the virtualized mode. In this example, however, the delay with may not be more than a fixed time.

In example embodiments of the present invention, while using hardware virtualization support to simulate the target software the simulator may need to emulate instructions (e.g., privileged instructions, instructions that perform I/O to devices, etc.) and/or when the simulation is close to the point at which an event is scheduled to be handled. Emulation of instruction may be frequent, but only a few instructions may be emulated at a time. In this example, switching between using hardware virtualization support and emulation using an interpreter or just-in-time compilation must be done with increased speed. To ensure that these switches are performed as fast as possible the target memory may be shared between the simulation using hardware virtualization support and the interpreter or just-in-time compilation, so that the memory state of the targets need not be copied when switching.

When hardware virtualization is used the target memory pages may be mapped into the address space of the target software through the page tables used by the hardware virtualization. The processor may execute directly from the pages and the instructions operate on the data in the pages. When an interpreter or just-in-time compiler is used the target memory may be mapped into the simulator process and treated as data. Instructions may be decoded from the target memory in software and the routines or recompiled code that performs the effects of the instructions may operate on the data.

Some simulator features (e.g., tracing of all memory accesses) may not be implemented using hardware virtualization support. For these features, the simulator may switch from using hardware virtualization support to executing target software with an interpreter or just-in-time compiler. Features that may not be implemented using hardware virtualization support may be used when some parts of the target software are running (e.g., if only one program of many running on the target is being traced). Because switching between the simulation mechanisms may be more cost effective when the target memory is shared, it may be advantageous to switch even when very short parts of the target code may be simulated using hardware virtualization support.

Setting up such switching may be more complicated for the user of the simulator, for example, if different features are enabled and disabled in several places. To help the user with this the simulator may detect when simulation using hardware virtualization is possible depending on what features are used. The simulator may automatically switch between hardware virtualization and interpretation or just-in-time compilation.

In at least one other example embodiment of the present invention, events may be handled non-deterministically. In this example, an initial state of the execution may be stored in the memory 204, and points in the execution at which the events are handled may be recorded using the hardware performance counter 206. In this example embodiment, the execution may be repeated with a deterministic simulator using the recorded data.

In at least some example embodiments of the present invention, target memory pages may be shared between different simulation mechanisms to improve performance. Simulation using hardware virtualization support, emulation of instructions and/or interpretation may share the same target memory pages, and need not copy information stored in the memory 204 when switching between hardware virtualization, emulation and/or interpretation. In at least this example embodiment of the present invention, instructions not run in virtualized processor mode may be emulated and/or features not supported by hardware virtualization support may be interpreted.

In at least some example embodiments of the present invention, the simulator 200 may detect the use of features not supported by hardware virtualization support and automatically switch to simulating target code using an interpreter.

Example embodiments of the present invention may simulate any arbitrary, unmodified code and/or arbitrary, unmodified software by deterministically executing the software and/or code directly on the host processor 202. For example, any unmodified target software (e.g., entire unmodified operating systems) may be simulated deterministically at higher speeds.

Because methods for simulating, according to example embodiments of the present invention, may be deterministic, all or substantially all features associated with deterministic simulators, such as, repeatable execution, reverse execution, etc. may be supported.

Simulators (e.g., deterministic full system simulators), according to at least some example embodiments of the present invention, may simulate a complete hardware system including processors, memories and/or devices. Simulators, according to at least some example embodiments of the present invention, may control the state of all components of the system, and may allow bugs (e.g., bugs that are hard to reproduce) to be fixed more easily by allowing a user or programmer to repeat an earlier execution.

Example embodiments of the present invention may be implemented, in software, for example, as any suitable computer program. For example, a program in accordance with one or more example embodiments of the present invention may be a computer program product causing a computer to execute one or more of the example methods described herein: a method for simulating arbitrary software and/or unmodified code directly on a host processor.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Functions or instructions of example embodiments may be implemented by processing one or more code segment, for example, in a computer, where instructions or functions may be executed for simulating arbitrary software and/or unmodified code directly on a host processor, in accordance with example embodiments of the present invention.

Further, such programs, when recorded on computer-readable storage media, may be readily stored and distributed. The storage medium, as it is read by a computer, may enable the simulation of arbitrary software and/or unmodified code directly on a host processor, in accordance with the example embodiments of the present invention.

Example embodiments of the present invention being thus described, it will be obvious that the same may be varied in many ways. For example, the methods according to example embodiments of the present invention may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

The executable computer program(s) may include the instructions to perform the described operations or functions. The computer executable program(s) may also be provided as part of externally supplied propagated signal(s). Such variations are not to be regarded as departure from the spirit and scope of the example embodiments of the present invention, and all such modifications as would be obvious to one skilled in the art are intended to be included within the scope of the following claims.

Although example embodiments of the present invention have been discussed herein with regard to specific applications and/or implementations, it will be understood that example embodiments may be utilized in, for example, debugging or development of user level applications, debugging or development of multi-threaded software, debugging or development of system level software, hardware modeling, hardware debugging, hardware development, driver development, driver debugging, prototyped hardware driver development (e.g., for not yet physically existing hardware) and/or any other suitable area.

Although example embodiments of the present invention have been shown and described with regard to certain operations (e.g., S114, S116, and/or S118 of FIG. 2) being performed serially or consecutively, it will be understood that any combination of these operations may be performed simultaneously and in parallel.

Although specific aspects may be associated with specific example embodiments of the present invention, as described herein, it will be understood that the aspects of the example embodiments, as described herein, may be combined in any suitable manner.

While example embodiments of the present invention have been particularly shown and described, it will be understood by those of ordinary skill in the art that various changes in form and details may be made therein without departing from the spirit and scope of the present invention as defined by the following claims.

What is claimed is:

1. A method for deterministically simulating arbitrary software directly on a host processor operating in a virtualized mode, the method comprising:
    executing, directly on the host processor operating in the virtualized mode, the arbitrary software without translation until the host processor exits from the virtualized mode when a performance counter metric is determined to be acceptable, and otherwise interpreting the arbitrary software until a scheduled event handling time is reached;
    calculating a current execution time at which the host processor exited from the virtualized mode; and
    handling an event based on at least the current execution time and the scheduled event handling time, the scheduled event handling time being a time at which a scheduled event is to be handled.

2. The method of claim 1, further including:
    setting a start execution time,
    generating the performance counter metric based on the start execution time and the scheduled event handling time,
    determining whether the performance counter metric is acceptable, and
    running the software if the performance counter metric is determined to be acceptable.

3. The method of claim 2, wherein the generating the performance counter metric further includes, calculating the difference between the start execution time and the scheduled event handling time, and converting the calculated difference into the performance counter metric.

4. The method of claim 2, wherein the performance counter metric is acceptable if the performance counter metric passes a threshold metric.

5. The method of claim 4, wherein the performance counter metric passes the threshold metric if the performance counter metric is greater than the threshold metric.

6. The method of claim 2, wherein if the performance counter metric is unacceptable, the software is interpreted from the current execution time until the scheduled event handling time, and the scheduled event is handled at the scheduled event handling time.

7. The method of claim 1, further including, comparing the current execution time with the scheduled event handling time, and wherein the executing further includes, handling an unscheduled event if the current execution time is less than the scheduled event handling time, and handling the scheduled event after handling the unscheduled event.

8. The method of claim 7 including distinguishing between the scheduled event and the unscheduled event based on comparing the current execution time with the scheduled event handling time.

9. The method of claim 1, further including, deciding if simulation of the arbitrary software has completed, and repeating the executing, calculating and handling if the simulation of the arbitrary software is not complete.

10. The method of claim 1, further including, comparing the current execution time with the scheduled event handling time, wherein the scheduled event is executed if the current execution time is equal to the scheduled event handling time.

11. The method of claim 1, wherein the simulating is performed on the host processor using hardware virtualization support.

12. The method of claim 1, wherein in the virtualized mode a state and behavior of targets in the arbitrary software is independent of the host processor simulating the arbitrary software.

13. A method for deterministically simulating arbitrary software directly on a host processor operating in a virtualized mode, the method comprising:
    executing, directly on the host processor operating in the virtualized mode, the arbitrary software without translation until the host processor exits from the virtualized mode when a performance counter metric is determined to be acceptable, and otherwise interpreting the arbitrary software until a scheduled event handling time is reached;
    calculating a current execution time in response to the host processor exiting from the virtualized mode, the current execution time being indicative of the time at which the host processor exited from the virtualized mode;
    determining whether an unscheduled event is to be handled before a scheduled event;
    executing at least one unscheduled event if the unscheduled event is to be handled before the scheduled event; and
    handling the scheduled event.

14. The method of claim 13, wherein the determining whether an unscheduled event is to be handled before a scheduled event further includes, checking whether an interrupt has been received by the host processor, checking whether emulation of an action is needed, and comparing the current execution time with the scheduled event handling time associated with the scheduled event, wherein an unscheduled event is to be handled before the scheduled event if an interrupt has been received by the host processor, emulation of an action is needed or the current execution time is less than the scheduled event time.

15. The method of claim 14, wherein the checking whether an interrupt has been received by the host processor and the checking whether emulation of an action is needed are performed simultaneously.

16. The method of claim 14, wherein the checking whether an interrupt has been received by the host processor and the checking whether emulation of an action is needed are performed consecutively.

17. The method of claim 14, wherein the unscheduled event is not to be handled before the scheduled event if no interrupt has been received by the host processor, no emulation of an action is needed and the current execution time is equal to the scheduled event time.

18. The method of claim 13, wherein the at least one unscheduled event is handling an interrupt received by the host processor, or emulation of an action.

19. The method of claim 13, further including,
    deciding if simulation of the arbitrary software has completed, and
    repeating the executing, calculating, determining, executing and handling for a next scheduled event handling time, if the simulation of the arbitrary software is not complete.

20. The method of claim 13, wherein the simulating is performed on the host processor using hardware virtualization support.

21. An apparatus for deterministically simulating arbitrary software, the apparatus comprising:
    at least one performance counter for tracking execution of the arbitrary software; and
    at least one host processor operating in a virtualized mode, each of the at least one host processor being configured to:
        execute, directly on the host processor operating in the virtualized mode, the arbitrary software without translation in the virtualized mode, the software being run until the processor exits from the virtualized mode when a performance counter metric is determined to be acceptable, and otherwise interpret the arbitrary software until a scheduled event handling time is reached,
        calculate a current execution time based on the value of the performance counter in response to exiting from the virtualized mode; and
        handle an event based on at least the current execution time and the scheduled event handling time, the scheduled event handling time being a time at which a scheduled event is to be handled.

22. The apparatus of claim 21, wherein each of the at least one host processor is further configured to set a start execution time, generate the performance counter metric based on the start execution time and the scheduled event handling time, determine whether the performance counter metric is acceptable, and run the software if the performance counter metric is determined to be acceptable.

23. The apparatus of claim 22, wherein each of the at least one host processor is further configured to calculate the difference between the start execution time and the scheduled event handling time, and convert the calculated difference into the performance counter metric.

24. The apparatus of claim 21, wherein the at least one host processor includes a plurality of host processors and the at least one performance counter includes a plurality of performance counters, each of the plurality of host processors having at least one of the plurality of performance counters corresponding thereto.

25. A non-transitory computer readable medium embodying a computer program for execution on a computer, the computer program being configured to perform a method for deterministically simulating arbitrary software directly on a host processor operating in a virtualized mode, the method comprising:
    executing, directly on the host processor operating in the virtualized mode, the arbitrary software without translation until the host processor exits from the virtualized mode when a performance counter metric is determined to be acceptable, and otherwise interpreting the arbitrary software until a scheduled event handling time is reached;
    calculating a current execution time at which the host processor exited from the virtualized mode; and
    handling an event based on at least the current execution time and the scheduled event handling time, the scheduled event handling time being a time at which a scheduled event is to be handled.

26. The non-transitory computer readable medium of claim 25, wherein the computer program is further configured to perform a method further including, setting a start execution time, generating the performance counter metric based on the start execution time and the scheduled event handling time, determining whether the performance counter metric is acceptable, and running the software if the performance counter metric is determined to be acceptable.

27. The non-transitory computer readable medium of claim 26, wherein the computer program is further configured to perform a method further including, calculating the difference between the start execution time and the scheduled event handling time, and converting the calculated difference into the performance counter metric.

28. A non-transitory computer readable medium embodying a computer program for execution on a computer, the computer program being configured to perform a method for deterministically simulating arbitrary software directly on a host processor operating in a virtualized mode, the method comprising:
 executing, directly on the host processor operating in the virtualized mode, the arbitrary software without translation until the host processor exits from the virtualized mode when a performance counter metric is determined to be acceptable, and otherwise interpreting the arbitrary software until a scheduled event handling time is reached;
 calculating a current execution time in response to the host processor exiting from the virtualized mode, the current execution time being indicative of the time at which the host processor exited from the virtualized mode;
 determining whether an unscheduled event is to be handled before a scheduled event;
 executing at least one unscheduled event if an unscheduled event is to be handled before the scheduled event; and
 handling the scheduled event.

29. The non-transitory computer readable medium of claim 28, wherein the computer program is further configured to perform a method further including, checking whether an interrupt has been received by the host processor, checking whether emulation of an action is needed, and comparing the current execution time with the scheduled event handling time, wherein an unscheduled event is to be handled before the scheduled event if an interrupt has been received by the host processor, emulation of an action is needed or the current execution time is less than the scheduled event time.

* * * * *